United States Patent
Hamzy et al.

(10) Patent No.: US 6,707,945 B2
(45) Date of Patent: Mar. 16, 2004

(54) METHOD AND APPARATUS FOR REDUCING IMAGE DATA STORAGE AND PROCESSING BASED ON DEVICE SUPPORTED COMPRESSION TECHNIQUES

(75) Inventors: Mark Joseph Hamzy, Austin, TX (US); Michael Richard Cooper, Austin, TX (US); Mark Wayne VanderWiele, Austin, TX (US); Scott Thomas Jones, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/106,136

(22) Filed: Mar. 26, 2002

(65) Prior Publication Data

US 2002/0131083 A1 Sep. 19, 2002

Related U.S. Application Data

(62) Division of application No. 09/282,638, filed on Mar. 31, 1999.

(51) Int. Cl.[7] .................................................. G06K 9/36
(52) U.S. Cl. ........................................ 382/232; 382/166
(58) Field of Search ................................. 382/232, 166, 382/162, 299, 300; 345/589, 590, 619

(56) References Cited

U.S. PATENT DOCUMENTS

| 5,717,845 | A | * | 2/1998 | Patrick et al. ............... 395/138 |
|---|---|---|---|---|
| 5,774,126 | A | * | 6/1998 | Chatterjee et al. ........... 345/431 |
| 6,266,150 | B1 | | 7/2001 | Brossman et al. .......... 358/1.15 |
| 6,317,217 | B1 | | 11/2001 | Toda .......................... 358/1.11 |
| 6,327,050 | B1 | | 12/2001 | Motamed et al. ........... 358/1.18 |
| 6,377,272 | B1 | * | 4/2002 | Chatterjee et al. ........... 345/605 |
| 6,525,743 | B1 | * | 2/2003 | Patrick et al. .............. 345/619 |

* cited by examiner

Primary Examiner—Yon J. Couso
(74) Attorney, Agent, or Firm—Duke W. Yee; Jeffrey S. LaBaw; Cathrine K. Kinslow

(57) ABSTRACT

Data is received from a memory, which includes bitmap images, for output on an output device. The images may be stored in compressed or uncompressed form. The operating system, application or generic graphics environment program interface, queries the printer driver for the types of image compression formats supported by the printer. If the image is available in a compatible compressed format, that compressed image is read from memory. Alternatively or in addition, the best possible compression format supported by the printer is selected from the formats available in the printer driver. The image is then loaded in a printer compatible compression format or compressed using the selected format. The image is spooled in the selected compression format. The image file may be spooled as a raw file or metafile depending on the embodiment used. When needed by the printer or video display, the spool file containing the compressed image is accessed from storage, and the compressed image is sent directly to the printer or video display without allocating memory for decompressing the bitmap image or decompressing the image.

5 Claims, 8 Drawing Sheets

METHOD AND APPARATUS FOR REDUCING IMAGE DATA STORAGE AND PROCESSING BASED ON DEVICE SUPPORTED COMPRESSION TECHNIQUES

This application is a divisional of application Ser. No. 09/282,638, filed Mar. 31, 1999, status pending.

BACKGROUND OF THE INVENTION

1. Technical Field

The present invention relates to the field of information handling systems and in particular to an improved data processing system for storing information for output. Still more particularly, the present invention relates to a method and apparatus for increasing printing speed while reducing processing time, memory requirements and the spool file size.

2. Description of Related Art

An application prints an image by first preparing the image and locating or placing it on a page to be printed. However, the printer may not be available for immediately printing the image or the image may be sent to a remote printer that the operating system does not control. Therefore, the bitmap image is spooled into a metafile with other images and text is positioned on the page to be printed. Before spooling the bitmap image, the generic graphics environment program interface (GEPI) compresses the bitmap using an arbitrary compression format such as a run-length-encoding algorithm, thereby reducing the file size of the bitmap. No consideration is made as to which format is going to be used by the printer. When the printer is available to print the bitmap, memory must be allocated for decompressing the bitmap into a device independent format. The generic graphics environment program interface must again be called, this time to decompress the bitmap using the same arbitrary compression format used to compress the bitmap into the allocated memory. The bitmap must again be compressed using another compression format, a format that is supported by the printer. The compressed bitmap is then sent to the printer for printing.

The above described process requires the image to be compressed twice, using separate compression formats. Additionally the above described process requires that a number of calls be placed between the application or generic graphics environment program interface and the printer driver in order to compress and decompress the image for the metafile.

Further, the compression algorithm used by the generic graphics environment program interface is arbitrarily selected. Also, additional memory must be allocated for decompressing the bitmap. Even further, more network traffic is required because the spool file is larger.

SUMMARY OF THE INVENTION

The present invention provides a method and apparatus in a data processing system for storing bitmap images. Data received from memory includes bitmap images for output on an output device, wherein the images are stored in compressed or uncompressed form. The operating system, application, or generic graphics environment program interface queries the printer driver for the types of image compression formats supported by the printer. If the image is available in a compatible compressed format, that compressed image is read from memory. Alternatively, or in addition, the best possible compression format supported by the printer is selected from the formats available in the printer driver. The image is then loaded in a printer compatible compression format or compressed using the selected format. The image is spooled in the selected compression format. The image file may be spooled as a raw file or metafile depending on the embodiment used. When needed by the printer or video display, the spool file containing the compressed image is accessed from storage, and the compressed image is sent directly to the printer or video display without allocating memory for decompressing the bitmap image or decompressing the image.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
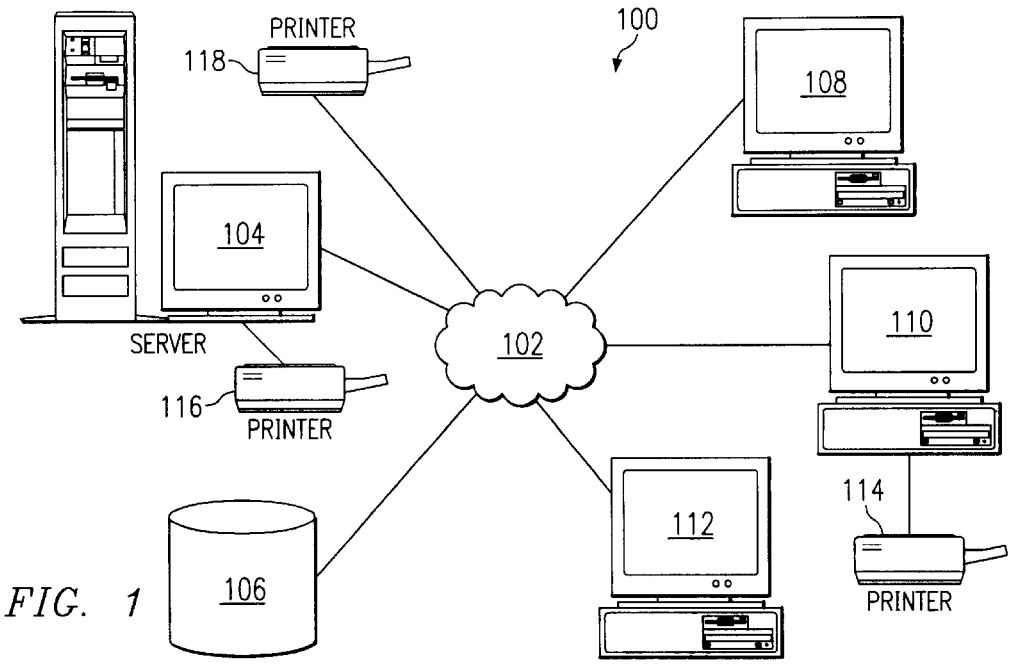
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, server 104 is connected to network 102 along with storage unit 106. In addition, clients 108, 110 and 112 are also connected to network 102. These clients 108, 110 and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications, to clients 108–112. Clients 108, 110 and 112 are clients to server 104. Distributed data processing system 100 may include additional servers, clients, and other devices not shown. Distributed data processing system 100 also includes printers 114, 116 and 118. A client, such as client 110 may print directly to printer 114. Clients, such as client 108 and client 112, do not have directly attached printers. These clients may print to printer 116, which is attached to server 104, or to printer 118, which is a network printer that does not require connection to a computer for printing documents. Alternatively, client 110 may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as an intranet or a local area network.

FIG. 1 is intended as an example and not as an architectural limitation for the processes of the present invention.

Figure 2:
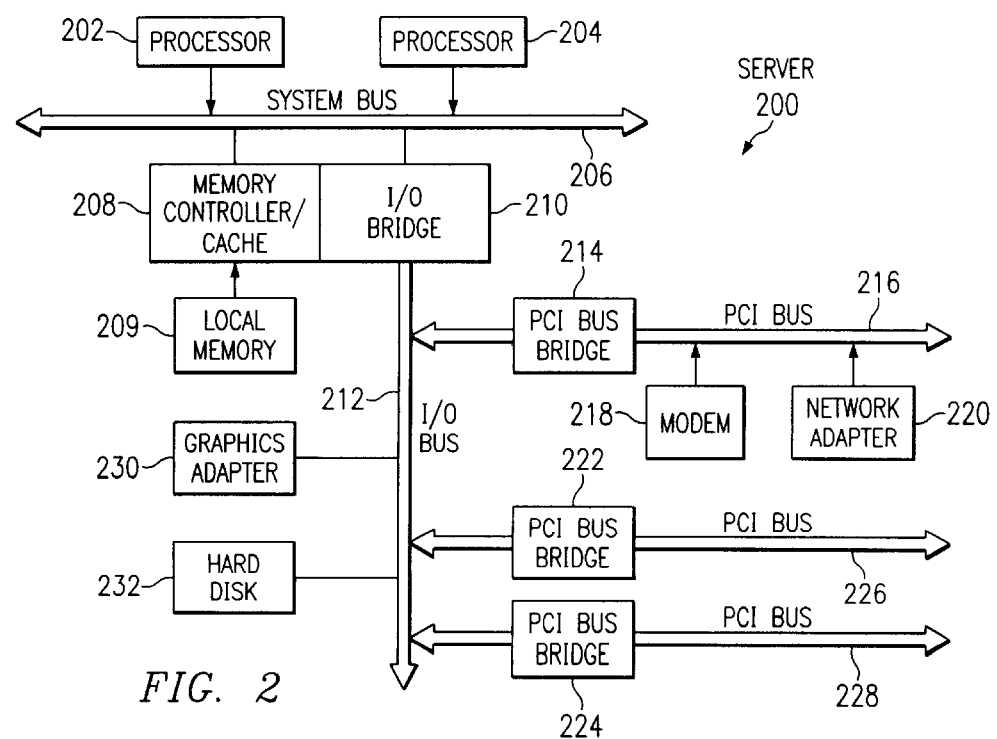
FIG. 2 depicts a block diagram of a data processing system that may be implemented as a server.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. Modem 218 and network adapter 220 may be connected to PCI bus 216. Typical PCI bus implementations support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as an optical disk drive and the like, may also be used, in addition to or in place of the hardware depicted. The depicted example is not meant to imply architectural limitations with respect to the present invention.

The data processing system depicted in FIG. 2 may be, for example, an IBM RISC/System 6000, a product of International Business Machines Corporation in Armonk, N.Y., running the Advanced Interactive Executive (AIX) operating system.

Figure 3:
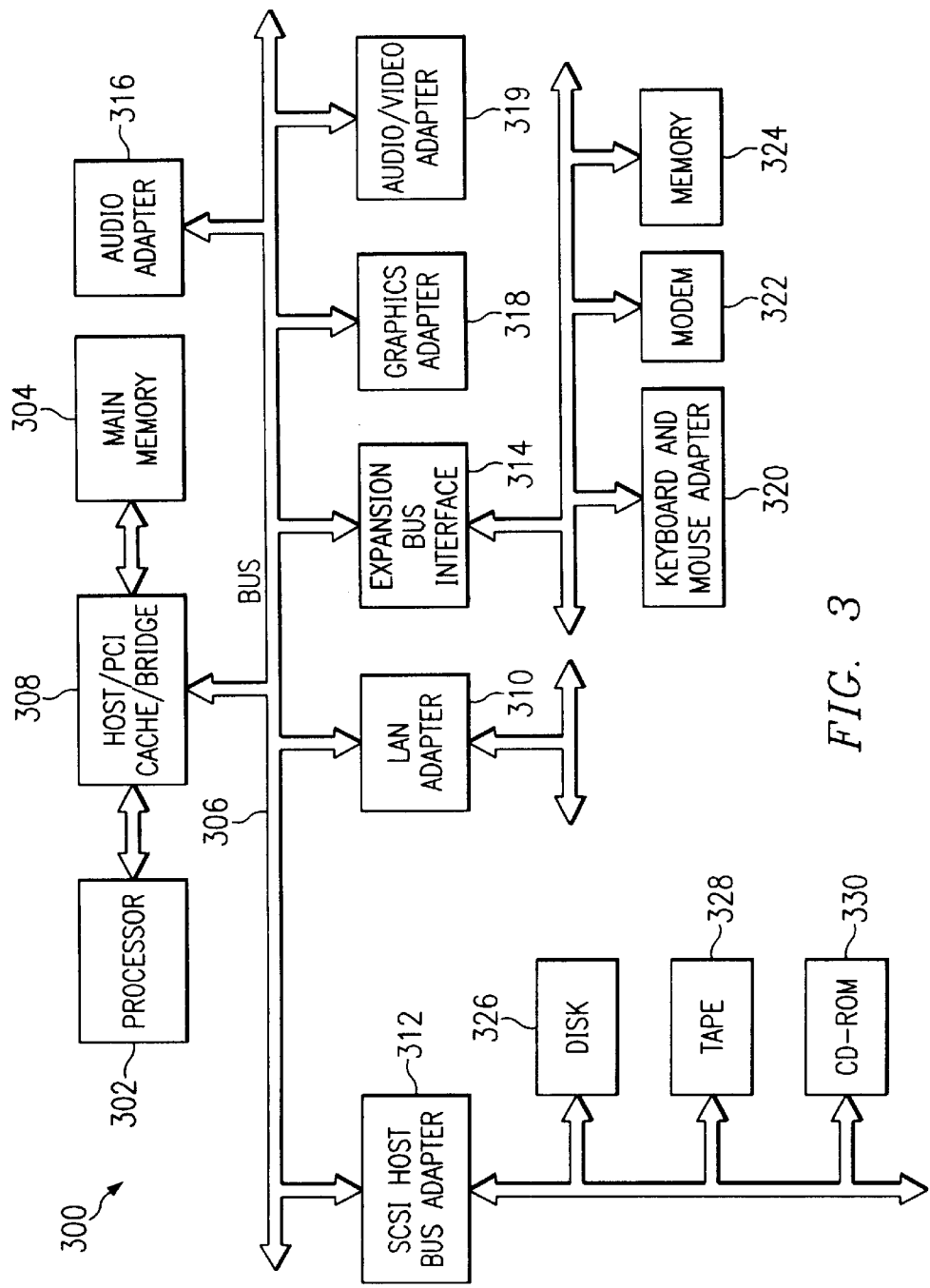
FIG. 3 illustrates a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component connection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, and CD-ROM drive 330. Typical PCI local bus implementations support three or four PCI expansion slots or add-in connectors.

In FIG. 3 of the present example, an operating system runs on processor 302 and is used to coordinate and provide control of various components within data processing system 300. The operating system may be a commercially available operating system, such as OS/2, which is available from International Business Machines Corporation. "OS/2" is a trademark of International Business Machines Corporation. An object oriented programming system such as Java may run in conjunction with the operating system, providing calls to the operating system from Java programs or applications executing on data processing system 300. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems as well.

The present invention provides a method, apparatus, and instructions for matching the compression format used by the application or GEPI to a compression format supported by the display device, such as a printer, video display, or any other output device. Rather than compressing the bitmap image using an arbitrary compression format, a compression format supported by the output device is used.

A mechanism is provided in which an application queries, for example, the printer driver for the best available compression format that is supported by the printer. Based on this information, an image is compressed in a printer compatible format. This eliminates the need to decompress the image and convert it into a system bitmap, to be recompressed with another format.

The printer may support several different compression formats for bitmapped images, one or more of which may be supported by the operating system. However, these formats are normally invoked in the de-spooling phase when the bitmapped image is retrieved by the spooler. This requires additional memory to be allocated for the decompression and recompression of the bitmapped image, even though the image may be available from memory where the image is store in a format which is supported by both the printer and the application.

In the present invention, the printer is queried for compression formats by either the application or the GEPI. The application then checks to see if the bitmap image is available in the printer supported compression format. If the bitmap image is available in such format, the application passes the compressed image to the printer driver or adds it to the metafile. If the GEPI handles the compression, the GEPI takes the system bitmap image created by the application and compresses the bitmap image using the best available compression format supported by the printer. The bitmap image is then spooled and stored in a metafile, usually on the hard drive, until the printer is ready for the metafile.

When the printer is ready, the printer driver merely passes the compressed bitmap image file to the printer. Because the printer supports the compression format, it is also capable of decompressing the image.

Figure 4A:
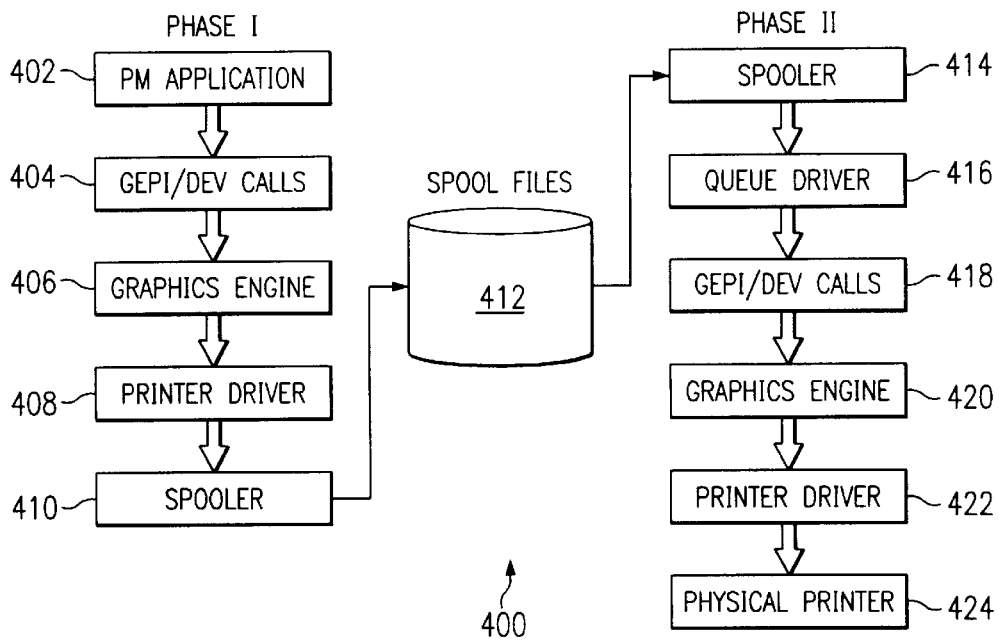
FIG. 4A illustrates a block diagram of a print system for printing a metafile, in which a preferred embodiment of the present invention may be implemented.

FIG. 4A is a block diagram illustrating a print system for use with a preferred embodiment of the present invention for metafile printing. Print system 400 performs the spooling and creation of a printer specific data stream on behalf of the application submitting the print request. In the depicted example, the printing process in print system 400 is divided into two phases: spooling, or queuing of the print data; and de-spooling, or sending the data to the output device. The creation of the printer specific data stream may be performed during the spooling phase or, in some configurations, when a metafile is used as a spool file. The printer specific data stream connectivity and server functionality, both phases of the print process, may be performed on a single system, or the first phase may be done on a client machine, such as client 110 in FIG. 1; and the second phase may be performed on a server, such as server 104 in FIG. 1.

FIG. 4A illustrates the spooling and de-spooling phases of metafile printing for use with the present invention. The spooling phase, Phase I in FIG. 4, is initiated when the presentation manager application 402 loads a compressed or uncompressed bitmap from memory. The bitmap image might be available in a compressed format, in which case the compressed bitmap image is decompressed, and the presentation manager application creates an operating system compatible bitmap image, such as an OS/2 bitmap. The type of bitmap format and type of application will vary with the type of operating system installed on the particular computer system. The presentation manager application then makes a series of GEPI and device calls 404 to graphics engine 406 and printer driver 408 in order to prepare the bitmap for spooling and eventual printing. Graphics engine 406 and printer driver 408 respond to the calls and set the bitmap image on the page to be printed. The bitmap image is set up on the page by the graphics engine and then compressed by the GEPI using an arbitrarily selected compression format. The compression format is not matched to a printer supported compression format; rather, typically, run-length-encoding is used.

Run-length-encoded (RLE) compression format is one available format, but others are routinely used as well. The file extension for graphics that have been reduced using run-length encoding is RLE. RLE is a compression method that converts consecutive identical characters into a code consisting of the character and the number marking the length of the run. The longer the run, the greater the compression. Run-length encoding works best with black-and-white or cartoon-style graphics and is used extensively to compress icons, banners and start-up logos. However, RLE is an arbitrary compression technique that may not match the device and, if it does, it may not be the best compression method.

Spooler 410 is software that manages printing in the computer. The application quickly generates the output on disk and sends it to the print spooler, which feeds the print images to the printer. The printing is then done in the background, while the user interacts with other applications in the foreground. Spooler 410 spools the metafile containing the compressed bitmap image and the GEPI and device calls used to set up and compress the image for temporary storage until the file can be printed or transferred to a remote printer for printing. The image is then written into a spool file 412.

In the de-spooling phase, Phase II in FIG. 4A, spooler 414 accesses the image within the spool file along with the GEPI and device calls. Queue driver 416 monitors the availability of the printer for printing the pages within a spool file. When the printer is available, GEPI and device calls 418 are once again placed to graphics engine 420 and printer driver 422. Because the image has been compressed using an arbitrary compression format that may not be used by the printer, memory must be allocated for decompression from the arbitrary compression format and recompressed in the printer format. The image compressed using the arbitrary compression format is decompressed by the GEPI in anticipation of the image being sent to the printer for printing. The image is made available in a device independent format for the printer driver. When the graphics engine is finished with the image, printer driver 422 recompresses the bitmap image using a compression format that is supported by the physical printer 424.

Figure 4B:
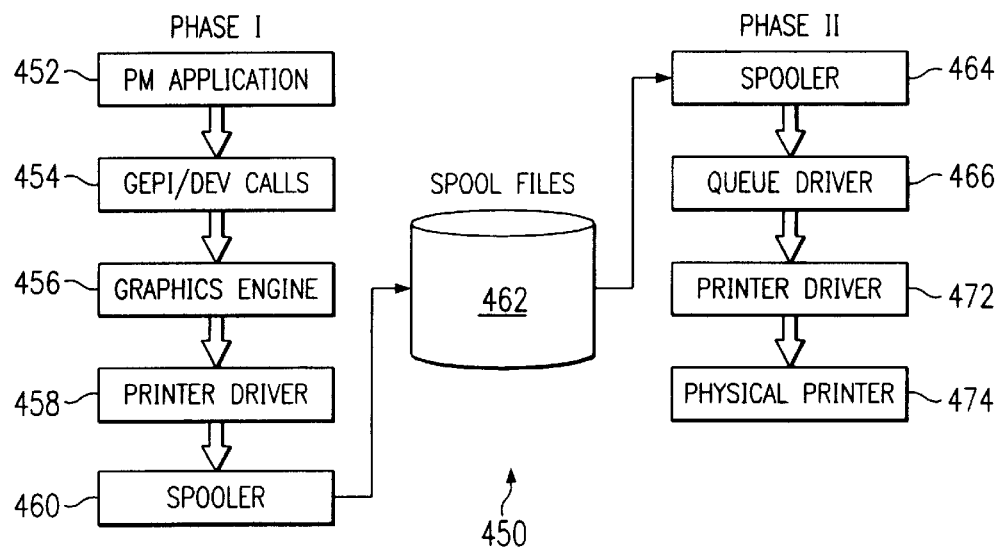
FIG. 4B illustrates a block diagram of a print system for printing a raw file, in which a preferred embodiment of the present invention may be implemented.

FIG. 4B illustrates the spooling and de-spooling phases of raw printing for use with the present invention. The process begins similarly to that described above in FIG. 4B. The spooling phase, Phase I in FIG. 4B, is initiated with the presentation manager application 452 loading a compressed bitmap from memory. The presentation manager application creates an operating system compatible bitmap image such as an OS/2 bitmap. The type of bitmap format and type of application will vary with the type of operating system installed on the particular computer system. The presentation manager application then makes a series of GEPI and device calls 454 to graphics engine 456 and printer driver 458 in order to prepare the bitmap for spooling and eventual printing. Graphics engine 456 and printer driver 458 respond to the calls and set the bitmap image on the page to be printed. The bitmap image is set up on the page by the graphics engine; however, rather than arbitrarily selecting compression format by the GEPI, the printer driver uses a compression format dictated by the printer. For instance, if the printer is a page description language printer, such as PostScript®, the page description language will dictate which compression formats are supported by the printer. The compression format is matched to a printer supported compression format and compressed by printer driver 458.

Spooler 460 spools the compressed image file or raw image file into a series of other spool files 462 for temporary storage until the file can be printed or transferred to a remote printer for printing. Unlike a metafile, which contains the compressed bitmap image and the GEPI and device calls used to set up and compress the image, the raw file contains only the printer commands and the compressed images.

In the de-spooling phase, Phase II in FIG. 4B, spooler 464 accesses the image. Because the image has been compressed using a printer supported compression format, the image does not need to be decompressed into a device independent format. Spooler 464 notifies queue driver 466 of the availability of the printer for printing the pages within a spool file. When the printer is available, the compressed image is transferred to printer driver 472 and sent to physical printer 474 without making GEPI and device calls.

If more than one image compression format is available from the printer to the application or GEPI, the best compression format must be selected from the available formats. One criterion for determining the best available format is choosing a compression format used by the image which is available to the application. If the application has the image available in a format supported by the printer, then the application can merely pass that compressed image on without creating a system bitmap.

If the bitmap image is not available in a compressed format that is supported by the printer, another criterion must be used. It is still necessary that the compression format be supported by both the printer and either the application or the GEPI. Furthermore, an important consideration is whether the compression will cause a reduction in resolution of the image. Another criterion is the file size of the compressed image.

As with other compression formats, image compression formats are generally divided between two classes—lossless and lossy. Lossy refers to data compression techniques in which data is lost. Tagged image file format (TIFF) compression technology is an example of lossless compression. For most types of data, lossless compression techniques can reduce the space needed by only about 50%. For greater compression, a lossy compression technique is considered.

The TIFF file format is one of the most widely supported file formats for storing bit-mapped images on personal computers. Another popular format is the standard bit-mapped (BMP) graphics format used in windows environments. BMP files store graphics in a format called device independent bitmap (DIB).

JPEG is lossy, meaning that the decompressed image is not quite the same as the image compressed. However, JPEG achieves much greater compression than is possible with lossless methods.

Other types of bitmap compressions/encodings are:

| | |
|---|---|
| TGA | Targa file format |
| PCX | PC Paint Brush |
| GIF | Graphics Interchange Format |
| G4 CCITT | Group 4 Type 1 FAX |
| TG4 CCITT | Group 4 Type 2 FAX |
| PNG | Portable Network Graphics |

After the bitmap image is compressed using one of the compression techniques above, or another available format, that compressed image is sent to physical printer 474 for printing.

Figure 5A:
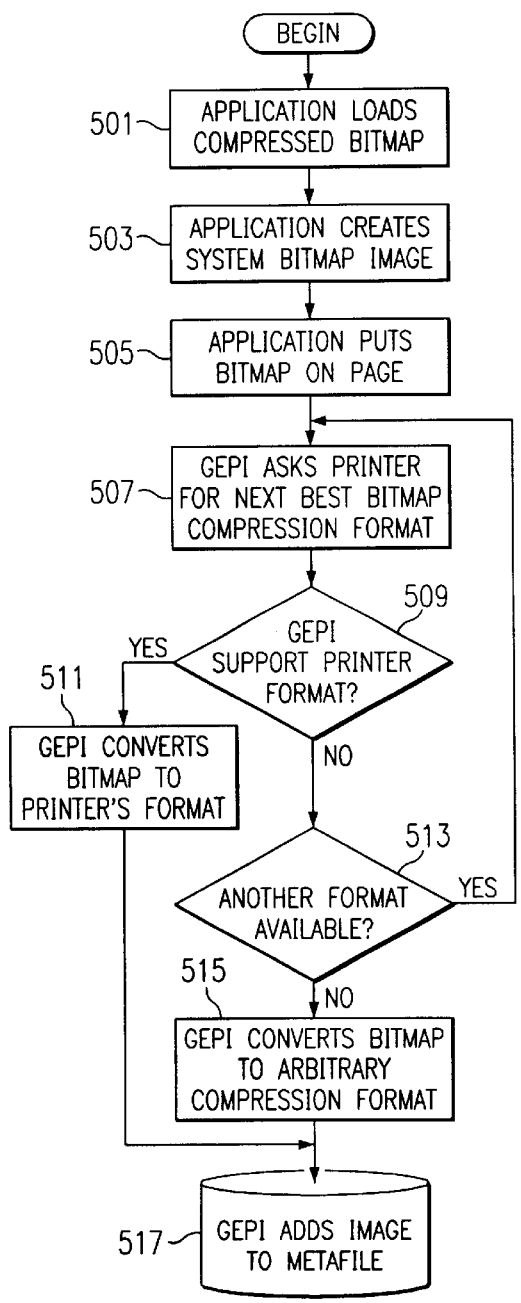
FIG. 5A illustrates the spooling phase of the present invention, including compressing a bitmap image by the GEPI, as shown in a preferred embodiment of the present invention.
Figure 5B:
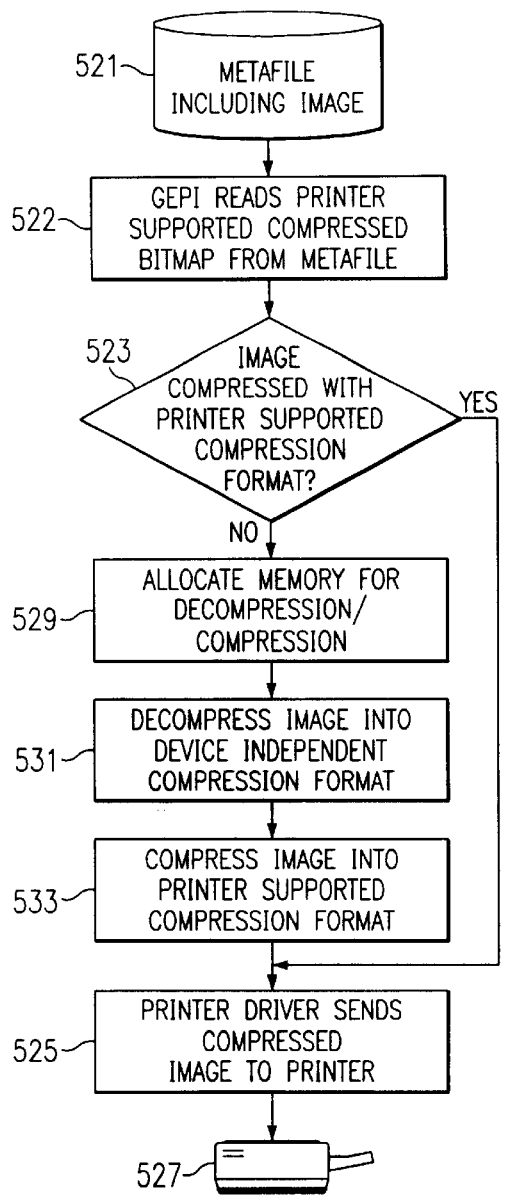
FIG. 5B illustrates the process of de-spooling the compressed image, including passing the compressed bitmap image to the printer.

FIGS. 5A and 5B are flow diagrams illustrating a printing process in accordance with a preferred embodiment of the present invention. In FIG. 5A, the process starts with the application loading a compressed bitmap (step 501) and creating an operating system bitmap image, such as OS/2 bitmap format (step 503). The bitmap is then available to be placed on a page by the application. At step 505, the application places the bitmap on the page by the graphics engine as explained above.

Next, the GEPI asks the printer driver for the next best bitmap compression format which the printer supports (step 507). The printer driver contains a list of all compression formats that the printer supports. When the printer driver returns its compression format selection, the GEPI checks to see if it can support the compression format selected by the printer or the printer format (step 509).

Alternatively, the GEPI could ask the printer driver for all printer supported compression formats and then select the compression format without calling the printer driver again. In the alternative embodiment of the present invention, the number of calls between the printer and the GEPI is greatly reduced because only a single call is needed for the printer driver to return every bitmap compression format supported by the printer.

Returning to FIG. 5A, if the GEPI supports the printer format selection, the GEPI converts the bitmap to the printer's format (step 511). The GEPI then adds the bitmap image, compressed using the printer format, to the metafile (step 517).

However, if the GEPI does not support the printer's selected format and, therefore, is unable to convert the image to the chosen compression format, the GEPI checks to see if another printer supported compression format is available from the printer (step 513). If another format is available, the process returns to step 507, where the GEPI again asks the printer for the next best format. The GEPI actually queries the printer driver rather than the printer itself.

There may be some cases in which another format is not available at step 513, in which case the process returns to the prior method of the GEPI converting the bitmap to a selected encoding format such as RLE (step 515). The arbitrarily compressed image is then added to the metafile.

Given that it is highly unlikely another compression format would not be available, and that the printer and operating system would most likely agree on a compression format, the arbitrary compression format would most likely not be used. However, the alternative flow of the process through step 515 eliminates the possibility of the process locking up because the GEPI does not support one of the printer's available compression formats.

FIG. 5B illustrates the de-spooling process of the present invention, wherein the metafile includes the compressed image and is available on the hard drive (step 521). The GEPI reads the printer supported compressed bitmap from the metafile (step 522). If the image has been compressed using an image compression format supported by the printer, the GEPI passes the image to the printer driver, and the printer driver sends the compressed image directly to the printer (step 525), which prints the image at step 527.

Note here that the steps of converting the image from an arbitrarily selected encoding bitmap format and re-compressing the image into a compression format compatible to the printer have been eliminated. The step of allocating memory is also eliminated, as is the need for tying up memory for decompression. Additionally, the size of the image stored in the metafile could also be reduced because the printer supported image format is likely to have a higher compression ratio, such as TIFF or JPEG, rather than the lower compression ratios of the arbitrarily selected formats, such as run-length-encoding, thereby also reducing network throughput.

However, if the image has not been compressed using a printer supported compression format, memory must be allocated for decompressing the image (step 529). The compressed image is converted into device independent format (step 531) and then compressed by the printer driver using the printer supported compression format (step 533). The printer driver then sends the compressed image to the printer (step 525), which prints the image at step 527.

Figure 6A:
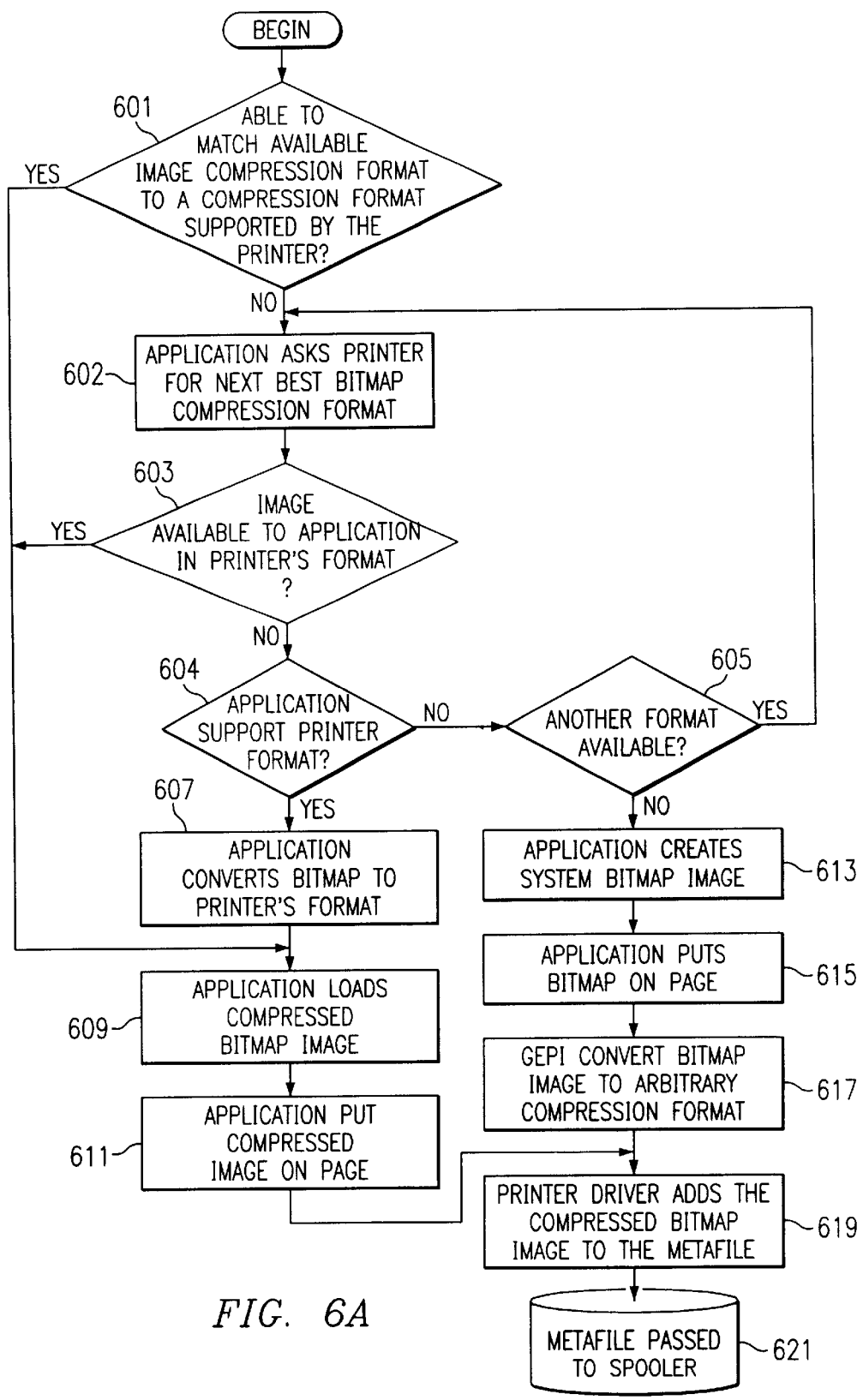
FIG. 6A illustrates the process whereby the bitmap images are compressed by the application and spooled into a metafile image, as shown in a preferred embodiment of the present invention.
Figures 6B, 7A:
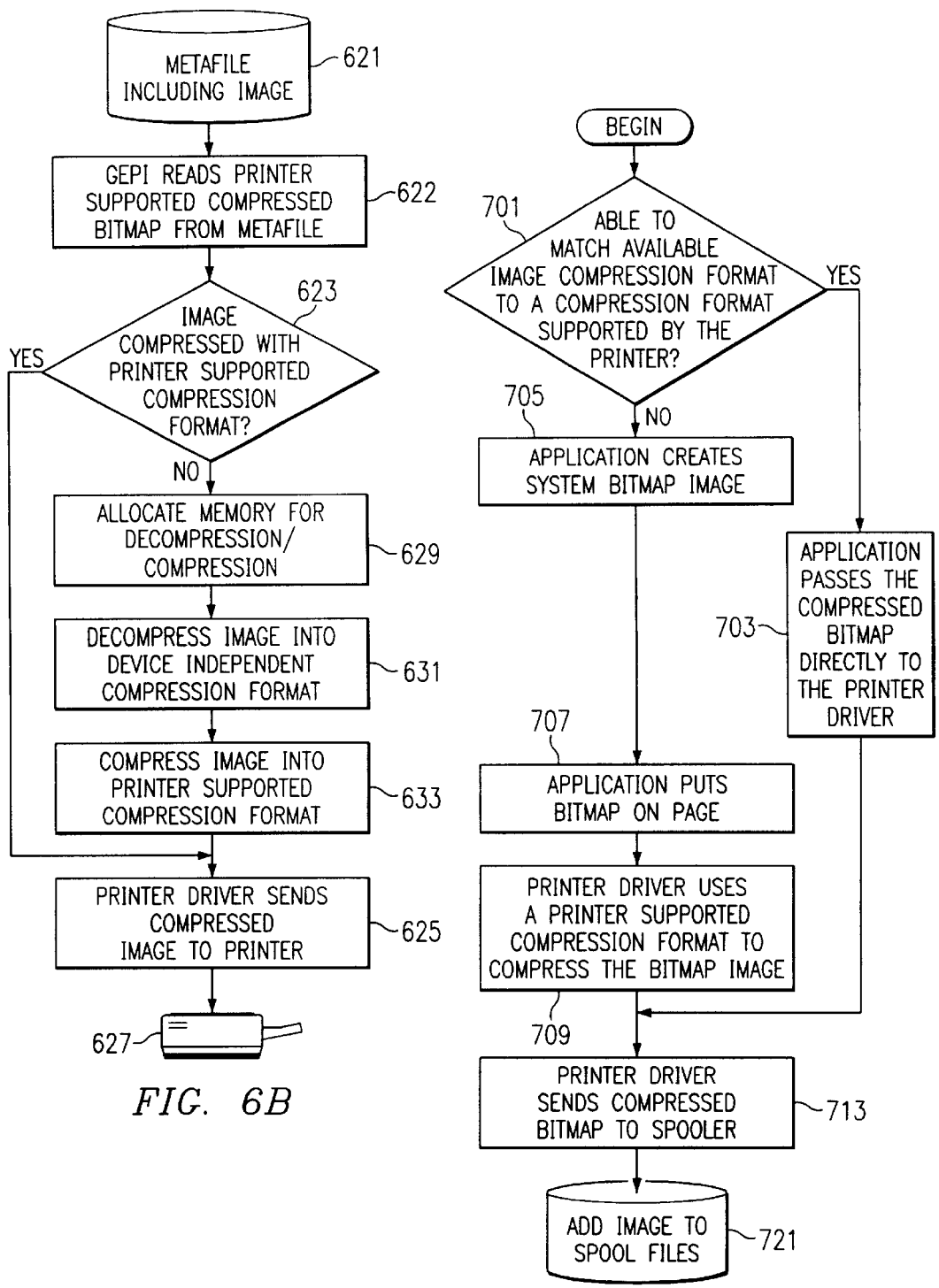
FIG. 6B illustrates the process of de-spooling the compressed image, including passing the compressed bitmap image to the printer.
FIG. 7A illustrates the process whereby the bitmap images are compressed by the printer driver and spooled into a raw file, as shown in a preferred embodiment of the present invention.

FIGS. 6A and 6B illustrate another preferred embodiment of the present invention. FIG. 6A illustrates the process of spooling compressed images into a metafile. As discussed above, an image may be available in a compressed format that matches a format supported by the printer. If such a compression format exists and meets the needs of the application, e.g., lossless, etc., the application does not need to create an operating system bitmap because a printer supported format already exists.

Initially, the application checks to see if an image is available in a format supported by the printer (step 601). Although not shown, this requires the application to call the printer driver for a list of formats supported by the printer. The application then checks to see if the image is stored in one of those formats. The image may be available in more than one format. If the application is able to match formats, and that is the only criteria necessary, the process advances to step 609, where the application loads the compressed image.

If the application is not able to match formats, or if other criteria exist for selecting a bitmap image compression format, the application begins calling the printer driver for the next best bitmap compression format (step 602).

The application then determines if the next best image compression format is available to the application, i.e., if the bitmap image has been stored in the selected compression format (step 603). If the next best format is available, the application loads the stored compressed bitmap image (step 609). If the next best format is not available, the application determines if it supports the printer's compression format (step 604). If the application supports the printer's compression format, the application may convert the bitmap to the printer format (step 607).

However, this step is optional. As discussed above, the bitmap image may already be available in a compressed format, making conversion unnecessary. In this case, the application loads the compressed bitmap (step 609) and puts the bitmap on the page (step 611). Then, the printer driver adds the compressed image to the metafile (step 619), and the metafile is passed to the spooler (step 621).

Conversely, if the application does not support the selected printer format (step 604), the application checks to see if another compression is available from the printer (step 605). If another compression format is available from the printer, the process returns to step 602, where the application asks the printer for the next best bitmap compression format. If another compression format is available, the process flows from step 602 through step 611, and the compressed image is added to the metafile at step 619.

However, as discussed above, there may be a case where all printer compression formats are not supported by the application. In this case, the application loads and creates a system bitmap (step 613) and puts the system bitmap on the page (step 615). Then, the GEPI converts the bitmap to an arbitrary compression format (step 617). As discussed above, the image compressed by the arbitrary compression method is then added to the metafile (step 619) and passed to the spooler (step 621).

FIG. 6B illustrates the process of de-spooling as disclosed by the present invention. Initially, the metafile including the compressed images is available on the hard drive (step 621). The GEPI reads the compressed bitmap from the metafile on the hard drive (step 622). If the compression format is supported by the printer, the printer driver sends the compressed images directly to the printer (step 625), and the printer prints the image (step 627).

If the compressed bitmap image is not a printer supported compression format, memory must be allocated for decompressing the image (step 629). The compressed image is converted to device independent format (step 631) and then compressed by the printer driver using the printer supported compression format (step 633). The printer driver then sends the compressed image to the printer (step 625), which prints the image at step 627.

Note again that the present invention eliminates the need for the image to be decompressed from the arbitrary compression format to a device independent format, which requires allocating memory for the process, and recompressed in a compression image compatible to the printer format. These steps have already been performed by the application, thereby eliminating the need for them to be accomplished in the de-spooling phase of the present invention.

Figure 7B:
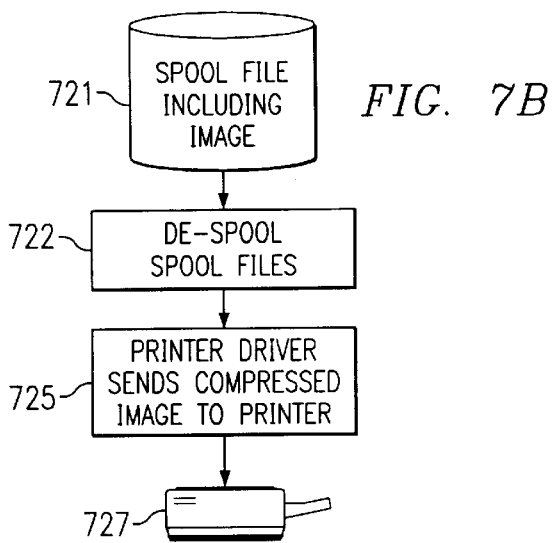
FIG. 7B illustrates the process of de-spooling the compressed image, including passing the compressed bitmap image to the printer.

FIGS. 7A and 7B illustrate another preferred embodiment of the present invention. FIG. 7A illustrates the process of spooling a compressed image into a raw file without the need for creating a metafile. As discussed above, an image may be available in a compressed format that matches a format supported by the printer. If such a compression format exists, the application does not need to create an operating system bitmap because a printer supported format already exists.

Initially, the application checks to see if an image is available in a format supported by the printer (step 701). Although not shown, this requires the application to call the printer driver for a list of formats supported by the printer. Also at step 701, the application checks to see if the image is stored in one of those formats. The image may be available in more than one format. If the application is able to match formats, the process advances to step 703, where the application passes the compressed bitmap directly to the printer driver.

Returning to step 701, if no image is stored in a printer supported format, the application creates a system bitmap image (step 705) and puts it on a page (step 707). Next, the printer driver converts the system bitmap to a printer supported format (rather than the GEPI or the application compressing the image) (step 709). The printer driver then sends the compressed bitmap to the spooler (step 713) and adds the image to the spool files (step 721).

FIG. 7B illustrates the process of de-spooling as disclosed by the present invention. Initially, the metafile including the compressed images is available on the hard drive (step 721). The spooler de-spools the files and accesses the compressed image file (step 722). Upon indication that the printer is available to print (usually from a queue driver not shown), the printer driver sends the compressed image directly to the printer (step 725), and the printer prints the image (step 727).

Figure 8:
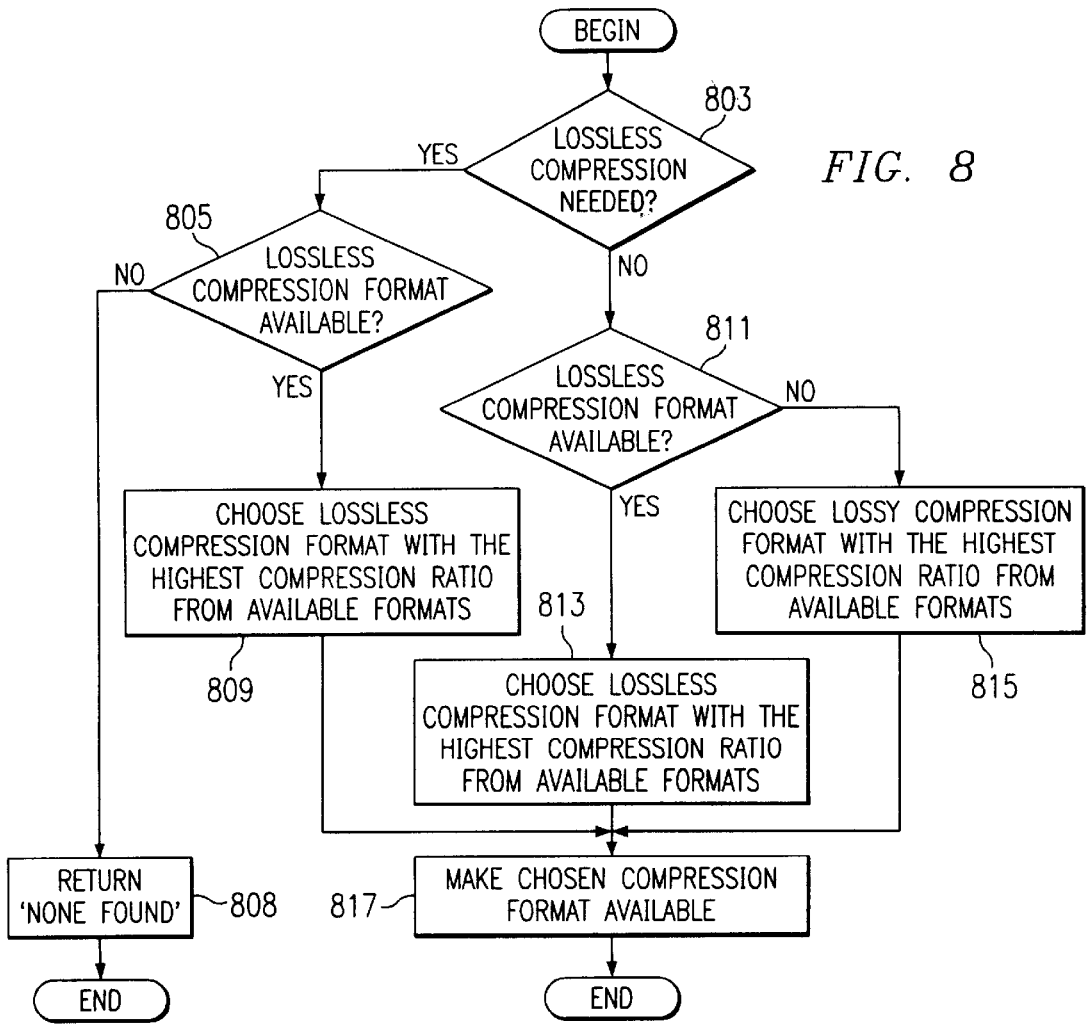
FIG. 8 illustrates the process of selecting an appropriate compression format from the formats supported by the printer.

FIG. 8 illustrates the process of selecting an appropriate compression format for the application. This process is different form matching the compression format supported by the printer and the operating system. The process described in FIG. 8 determines the best compression format for printing the bitmap image without regard to whether that compression format is supported by the printer and the application, or whether the bitmap image is available to the application, stored in that format.

As discussed above, the present invention discloses two embodiments of this process. One embodiment involves a series of calls between either the application or the GEPI and the printer driver. In the other embodiment, the process is accomplished totally within either the application or the GEPI by calling the printer driver for a list of available compression formats supported by the printer.

The process begins by determining need for a lossless compression (step 803). If a high quality, highly reproducible image is needed, the most appropriate selection is a lossless compression format, such as the TIFF format described above. If this is the case, a lossless compression format must be available from the printer driver. The lossless compression format must also be supported either by the application or by the GEPI, depending on which is assigned the task of compressing the image. The availability of a lossless compression format is determined at step 805.

If more than one lossless compression format is available, then the lossless compression format with the highest compression ratio of those available is chosen (step 809). After the compression format is chosen, it is made available to either the application or the GEPI, depending on which embodiment of the present invention is being implemented (step 817).

Returning to step 805, if no lossless compression format is available from the printer, or if no lossless compression format is supported by either the application or the GEPI, then a 'none found' is returned (step 808), and the process ends.

However, the return of a 'none found' does not necessarily mean that the image will not be compressed. At such point, because compressing the image with a lossy compression format would produce a less than satisfactory image, the process returns to the prior method of compressing the image with the RLE format for spooling.

Returning again to step 803, if no lossless compression format is needed, the process flows to step 811, where it is determined anyway whether a lossless compression format is available. Under certain circumstances, selecting a lossless compression format might be appropriate because the lossless compression format may have a compression ratio compatible with that of the available lossy compression formats, without a reduction in image quality. Therefore, if a lossless compression format is available, the process chooses the lossless compression format with the highest compression ratio available from the available formats (step 813). The chosen format is then made available to the GEPI or application for use (step 817). However, the chance of a lossless compression format being selected over a lossy compression format strictly on the basis of compression ratios is unlikely, because lossy compression formats provide a far greater compression than lossless formats.

If a lossless compression format is not available (step 811), or if it is not an appropriate choice, the process flows to step 815, and the lossy compression format with the highest compression ratio available within the limits on image quality loss is chosen from the formats available. After being chosen, the lossy compression format is made available to the GEPI or application as needed (step 817). The process then ends.

Upon determining the best compression format for printing the bitmap image as described in FIG. 8, the application determines if an image is available from memory in that compression format, as described in FIG. 6A. If such a bitmap exists in memory, it is used; if not, a system bitmap must be created in order to convert the bitmap to the selected compression format.

Figure 9:
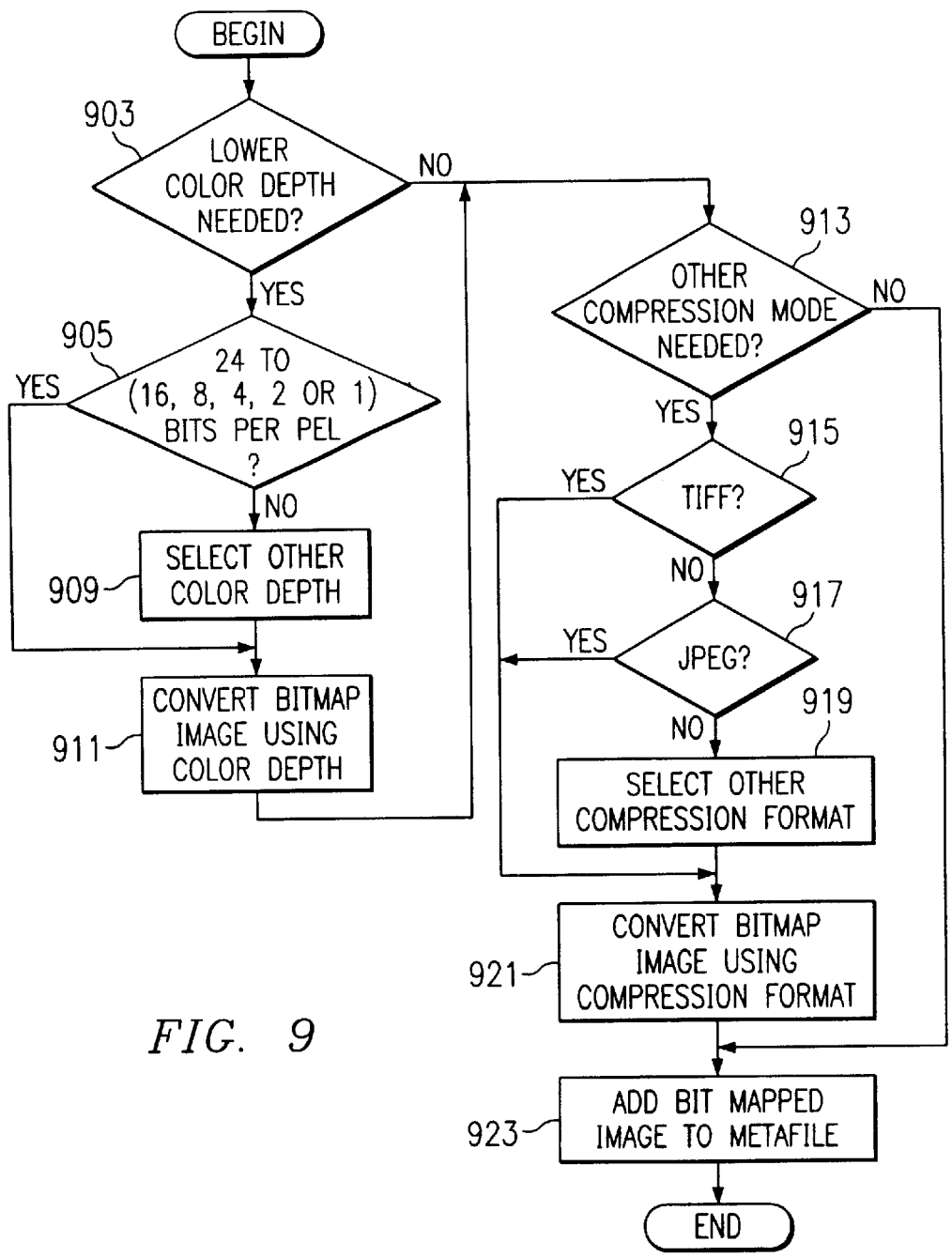
FIG. 9 illustrates a preferred embodiment of the present invention for selecting an image compression type.

Turning to another preferred embodiment of the present invention, FIG. 9 illustrates a process for selecting an image compression type which might be used in conjunction with the best compression format for printing the bitmap image described in FIG. 8. The process of selecting an image compression type which begins by determining whether or not a color depth compression type is needed (step 903). A color depth compression is lossy, and a degraded image will result if a color bit reduction algorithm is used. If a decision is made by the device to compress the color depth (bits per pel conversions 24, 16, 8, 4, 2, 1), for instance from 24 bits to 16, 8, 4, 2, or 1 bits per pel of color depth (step 905).

The process then selects the proper algorithm for the image reproduction selected by the device (step 905). If the amount of color compression correlates to the device reproduction, the process is passed to step 911, and the bitmap image is converted using the selected color depth. If, however, the amount of color compression does not correlate to the device reproduction, another color depth is selected (step 909), and the image is converted using the selected color depth (step 911). After the image has been converted at step 911, a determination is made as to whether or not another compression mode is needed (step 913).

Returning to step 903, if it is decided not to lower the color depth, the process flows directly to step 913, bypassing steps 905, 909 and 911. If no further bitmap compression is needed, the bitmap (whether color depth compressed or not) is added to the metafile at step 923.

However, if a bitmap compression format is needed at step 913, the process attempts to determine what compression modes are available and selects an appropriate compression mode. The process first flows to step 915, where it looks for well known compression formats, such as TIFF. If TIFF compression mode, for example, is selected, the process flows to step 921, and the bitmap is converted using TIFF format.

Alternatively, if the TIFF format is not appropriate, the process flows through a series of steps attempting to select an appropriate compression format. At step 917, for example, the process checks for JPEG; and at step 919, the process attempts to select another format from those that are available, which could include run-length-encoded format.

The bitmap image is then converted using the selected compression format (step 921).

The foregoing steps are merely examples. One of ordinary skill in the art will realize that the process for selecting a bitmap compression format might proceed in several directions not specifically embodied herein.

Note that the bitmap image compression format is a second layer of compression added onto the color depth compression already invoked above at step 911. Alternatively, a compression mode can be selected without reducing the color depth by merely passing through decision block 903 and selecting a compression format at steps 915–919. In either event, the bitmap image is added to the metafile at step 923.

It is important to note that while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such as floppy discs, hard disk drives, RAM, CD-ROMs, and transmission-type media, such as digital and analog communications links.

The description of the present invention has been presented for purposes of illustration and description but is not intended to be exhaustive or limited to the invention in the form disclosed. Many modifications and variations will be apparent to those of ordinary skill in the art. The present embodiment was chosen and described in order to best explain the principles of the invention and the practical application, and to enable others of ordinary skill in the art to understand the invention for various embodiments with various modifications as are suited to the particular use contemplated.

What is claimed is:

1. A method in a data processing system for compressing an image to be displayed by a device, the method comprising:

receiving a file for displaying, wherein the file includes a bitmap image;

reducing a color depth associated with each pel in the bitmap image, wherein the bitmap image is reduced to a reduced bitmap image and the reduction is performed by an application;

determining a compression format supported by the device;

converting the bitmap image using the compression format, wherein the bitmap image is converted to a converted bitmap image by the application; and spooling the reduced bitmap image.

2. A method in a data processing system for compressing an image to be displayed by a device, the method comprising:

receiving a file for displaying, wherein the file includes a bitmap image;

reducing a color depth associated with each pel in the bit map image, wherein the bitmap image is reduced to a reduced bitmap image and the reduction is performed by a generic graphics environment program interface;

determining a compression format supported by the display device;

converting the bitmap image using the compression format, wherein the bitmap image is converted to a converted bitmap image by the generic graphics environment program interface; and spooling the reduced bitmap image.

3. A data processing system for compressing an image to be displayed by a device, wherein the data processing system comprising:

receiving a file for displaying, wherein the file includes a bitmap image;

reducing a color depth associated with each pel in the bitmap image, wherein the bitmap image is reduced to a reduced bitmap image and the reduction is performed by an application;

determining means for determining a compression format supported by the display device;

converting means for converting the bitmap image using the compression format, wherein the bitmap image is convened to a converted bitmap image by the application; and spooling the reduced bitmap image.

4. A data processing system for compressing an image to be displayed by a device, the system comprising:

receiving means for receiving a file for displaying, wherein the file includes a bitmap image;

reducing means for reducing a color depth associated with each pel in the bit map image, wherein the bitmap image is reduced to a reduced bitmap image and the reduction is performed by a generic graphics environment program interface;

determining means for determining a compression format supported by to display device;

converting means for converting the bitmap image using the compression format, wherein the bitmap image is converted to a converted bitmap image by the generic graphics environment program interface; and storing means for storing the reduced bitmap image in memory means.

5. A computer program product for implementing a method in a computer system for compressing an image to be displayed by a device, the computer program product being implemented by a series of instructions and stored on a computer readable medium, the instructions comprising:

receiving instructions for receiving a file for displaying, wherein the file includes a bitmap image;

reducing instructions for reducing a color depth associated with each pel in the bit map image, wherein the bitmap image is reduced to a reduced bitmap image and the reduction is performed by an application;

determining instructions for determining a compression format supported by the display device;

converting instructions for converting the bitmap image using the compression format, wherein the bitmap image is converted to a converted bitmap image by the generic graphics environment program interface; and spooling instructions for spooling the reduced bitmap image.

* * * * *

UNITED STATES PATENT AND TRADEMARK OFFICE
CERTIFICATE OF CORRECTION

PATENT NO. : 6,707,945 B2
DATED : March 16, 2004
INVENTOR(S) : Hamzy et al.

It is certified that error appears in the above-identified patent and that said Letters Patent is hereby corrected as shown below:

Column 14,
Line 21, before "to a converted", delete "convened" and insert -- converted --
Line 34, after "by", delete "to" and insert -- the --

Signed and Sealed this

Second Day of August, 2005

JON W. DUDAS
*Director of the United States Patent and Trademark Office*